United States Patent [19]
Kudoh et al.

[11] Patent Number: 5,140,502
[45] Date of Patent: Aug. 18, 1992

[54] SOLID ELECTROLYTIC CAPACITORS AND METHOD FOR MANUFACTURING THE SAME

[75] Inventors: Yasuo Kudoh, Yokohama; Sohji Tsuchiya, Kanagawa; Toshikuni Kojima, Kawasaki; Masao Fukuyama, Yokohama, all of Japan

[73] Assignee: Matsushita Electric Industrial Co., Ltd., Osaka, Japan

[21] Appl. No.: 667,988

[22] Filed: Mar. 12, 1991

[30] Foreign Application Priority Data

Mar. 12, 1990 [JP] Japan ............................ 2-60192
Mar. 26, 1990 [JP] Japan ............................ 2-76047

[51] Int. Cl.$^5$ .................... H01G 9/00; H01G 1/14
[52] U.S. Cl. ............................... 361/540; 29/25.03
[58] Field of Search ............... 361/517, 518, 523–527, 361/534–540; 29/25.03

[56] References Cited

U.S. PATENT DOCUMENTS

| | | | |
|---|---|---|---|
| 3,148,240 | 9/1964 | Harrison | 29/25.03 X |
| 3,648,337 | 3/1972 | Greskamp et al. | 29/25.03 X |
| 4,558,399 | 12/1985 | Toyama et al. | 361/520 |
| 4,805,074 | 2/1989 | Harakawa et al. | 361/525 |
| 4,864,472 | 9/1989 | Yoshimura et al. | 361/525 |
| 4,933,106 | 6/1990 | Sakai et al. | 252/500 |

FOREIGN PATENT DOCUMENTS

| | | | |
|---|---|---|---|
| 152082 | 8/1985 | European Pat. Off. | |
| 132032 | 10/1980 | Japan | 29/25.03 |
| 56-10777 | 3/1981 | Japan | |
| 58-17609 | 2/1983 | Japan | |
| 60-244017 | 12/1985 | Japan | |
| 1-310529 | 12/1989 | Japan | |

*Primary Examiner*—Donald A. Griffin
*Attorney, Agent, or Firm*—Lowe, Price, LeBlanc & Becker

[57] ABSTRACT

Solid electrolytic capacitors comprise a capacitor element having a valve metal substrate, a dielectric film formed thereon, and a conductive polymer layer formed on the dielectric film. The capacitor element is encased in a resin casing as not directly contacting the element with the resin casing. The capacitance and leakage current characteristics are improved. Alternatively, a capacitor element includes a valve metal substrate, a dielectric film, an inorganic conductive layer and a conductive polymer layer formed on the substrate in this order, wherein the conductive polymer layer is formed after anodization of the inorganic conductive layer bearing substrate. The life of the resulting capacitor is significantly prolonged. This capacitor element may be encased in a resin casing in a manner as set forth above. Methods for manufacturing the solid electrolytic capacitor are also provided.

21 Claims, 1 Drawing Sheet

SOLID ELECTROLYTIC CAPACITORS AND METHOD FOR MANUFACTURING THE SAME

BACKGROUND OF THE INVENTION

1. Field of the Invention

This invention relates to solid electrolytic capacitors using solid electrolytes which exhibit good stability, reliability and prolonged life under high temperature and high humidity conditions. The invention also relates to methods for manufacturing such solid electrolytic capacitors.

2. Description of the Prior Art

In recent trends toward digitalization of circuits of electric and electronic appliances, there is a strong demand for capacitors which exhibit a low impedance in a high frequency range and have a small size and a high capacitance.

Known capacitors used in a high frequency range include, for example, plastic film capacitors, mica capacitors, layer-built ceramic capacitors and the like. These capacitors are so large in size that a difficulty is involved in attaining a large capacitance.

On the other hand, a certain type of capacitor is known as having a large capacitance. Such capacitors include, for example, an aluminium dry electrolytic capacitor and an aluminium or tantalum solid electrolytic capacitor. However, the electrolytes used in these capacitors, such as liquid electrolytes and manganese dioxide solid electrolytes are high in resistance, so that a satisfactorily lower impedance in a high frequency range cannot be obtained.

In recent years, there have been proposed and used organic semiconductors having high conductivity and anodizability instead of the manganese dioxide solid electrode. Typical organic semiconductors include 7,7,8,8-tetracyanoquinodimethane complex salts, which may be hereinafter referred to simply as TCNQ salt or salts. As set forth in Japanese Patent Publication No. 56-10777 and Japanese Kokai No. 58-17609, aluminium solid electrolytic capacitors using the TCNQ salts are remarkably improved in frequency and temperature characteristics, resulting in a low leakage current characteristic. Although the TCNQ salts are organic semiconductive materials, they exhibit high thermal stability. Accordingly, it is considered that the capacitors using the TCNQ salts have a longer life at high temperatures than known dry electrolytic capacitors.

Moreover, solid electrolytic capacitors using another type of organic conductive polymer have been proposed, for example, in Japanese Kokai Nos. 60-37114 and 60-244017. In such capacitors, heterocylic monomers, such as pyrrole, thiophene and the like, are electrolytically polymerized using support electrolytes, thereby forming, on an anode, a highly conductive polymer layer containing the anions of the support electrolyte as a dopant.

In addition, Japanese Kokai 1-310529 describes a solid electrolytic capacitor wherein a conductive polymer layer is formed by depositing a metal or a conductive metal compound or oxide on a dielectric film and subjecting a polymerizable monomer to electrolytic polymerization while contacting an electrode for electrolytic polymerization with the metal or the metal compound.

However, solid electrolytic capacitors have generally the problems that the ability of repairing defects of a dielectric film with the solid electrolyte is low and that the adhesion between the electrolyte and the dielectric film is low. These problems become more pronounced especially when conductive polymers are used as the solid electrolyte. In general, solid electronic elements are used by encacement in resin casings in order to prevent the elements from suffering mechanical damages or from deterioration by the attack of oxygen or moisture. With solid electrolytic capacitors using conductive polymer electrolytes, however, the element undergoes a shrinking stress which occurs during a curing or cooling step of the resin casing, leading to the problem that the electrolyte layer is apt to separate from the dielectric film, or the dielectric film is liable to be damaged. This results in a lowering of the capacitance or an increase of the leakage current. Since the organic solid electrolyte in low is the film-repairing ability, the increase of the leakage current characteristic cannot be stopped even after the element has been subsequently aged. To avoid this, attempts have been often made to reduce the stress by the use of resins having rubber elasticity but are not in success because there arise such problems as mentioned above when such a capacitor is placed under abruptly varying temperature conditions. Thus, it is not possible to prevent degradation of capacitor characteristics.

In particular, when used as a solid electrolyte, TCNQ salts have the problem that a specific resistance unfavorably increases upon application of the salt and that the adhesion to an anode metal foil is poor.

On the other hand, with capacitors using a high conductive polymer layer formed by electrolytic polymerization, it is technically difficult to form the electrolytically polymerized layer on a dielectric layer. Although it is known that an electrolytically polymerized layer of high conductivity is formed on a conventional anode such as, for example, platinum, carbon or the like, by using a solution of a heterocylic compound, such as pyrrole, thiophene or derivatives thereof, and an appropriate support electrolyte, the dielectric film is insulative in nature and any electric current does not pass through the dielectric film. In this sense, it will be principally difficult to electrolytically form the conductive polymer layer on the dielectric film.

It is also known that an electrolytically polymerized layer is readily formed on a conductive layer formed on the dielectric field through an electrode for electrolytic polymerization. However, the resulting capacitor is disadvantageous in that the dielectric film is liable to degrade by the interaction between the conductive layer and the dielectric film and that the life of the capacitor under high temperature and high humidity conditions is poor.

SUMMARY OF THE INVENTION

It is therefore an object of the present invention to provide an improved solid electrolytic capacitor using an organic conductive polymer solid electrolyte wherein the solid electrolyte is unlikely to separate from a dielectric film formed on a valve metal anode and the dielectric film is prevented from being damaged whereby the capacitor suffers little degradation of characteristics such as a lowering of capacitance and an increase of leakage current.

It is another object of the invention to provide an improved solid electrolytic capacitor using an electrolytically polymerized layer formed on a dielectric film through an inorganic conductive layer serving to expedite growth of the polymerized layer wherein the degradation of the dielectric film as will be caused by the interaction between the conductive layer formed on which the electrolytically polymerized layer is to be formed and the dielectric film is appropriately prevented, so that the capacitor has a prolonged life under high temperature and high humidity conditions.

It is a further object of the invention to provide methods for manufacturing the solid electrolytic capacitors of the types mentioned above.

The above objects of the invention can be achieved, according to one embodiment of the invention, by a solid electrolytic capacitor which comprises:

a capacitor element including a valve metal substrate having a dielectric film on the surfaces thereof, and a conductive polymer solid electrolyte layer formed on the dielectric film; and a resin casing encasing the capacitor element substantially in a spaced relation to the casing. The capacitor element is held within the casing through leads extending from the capacitor element. Since the solid electrolytic capacitor element is encased in the resin casing in such a way that the element is kept away from or is not directly contacted with the resin casing, any stress on the element from the resin casing which will occur during the course of a curing or cooling step or under widely varying temperature conditions can be appropriately prevented.

The solid electrolyte can be manufactured by a procedure which comprises:

providing a valve metal substrate;

forming a dielectric film on the surfaces of said valve metal substrate;

forming a conductive polymer solid electrolyte layer formed on the dielectric film to provide a capacitor element; and encasing said capacitor element in a resin casing substantially in a spaced relation of the capacitor element from the resin casing in an airtight condition. The airtight condition is established by welding, preferably ultrasonic welding, of the resin casing.

In practice, leads are attached to the capacitor element as extending through the resin casing to outside, and the leads are fixed to the resin casing with a curable resin.

According to another embodiment of the invention, there is also provided a solid electrolytic capacitor which comprises a capacitor element including a valve metal substrate having a dielectric film on the surfaces thereof and an inorganic conductive layer formed on the dielectric film, and a conductive polymer layer formed on the conductive layer after subjecting the inorganic conductive layer-bearing valve metal substrate to anodization in a solution containing anions. By the anodization, the inorganic conductive layer is stabilized and the degradation of the dielectric film is suppressed to an appreciable extent when the capacitor is exposed to high temperature and high humidity conditions. The capacitor element of this embodiment should preferably be encased in a resin casing in such a state as set forth with respect to the first embodiment.

The solid electrolytic capacitor of the second embodiment can be manufactured by a method which comprises:

forming a dielectric film on a valve metal substrate;

forming an inorganic conductive layer on the dielectric film;

subjecting the inorganic conductive layer-bearing valve metal substrate to anodization in a solution containing anions; and forming a conductive polymer layer on the anodized inorganic conductive layer.

DETAILED DESCRIPTION AND EMBODIMENTS OF THE INVENTION

Figure 1:
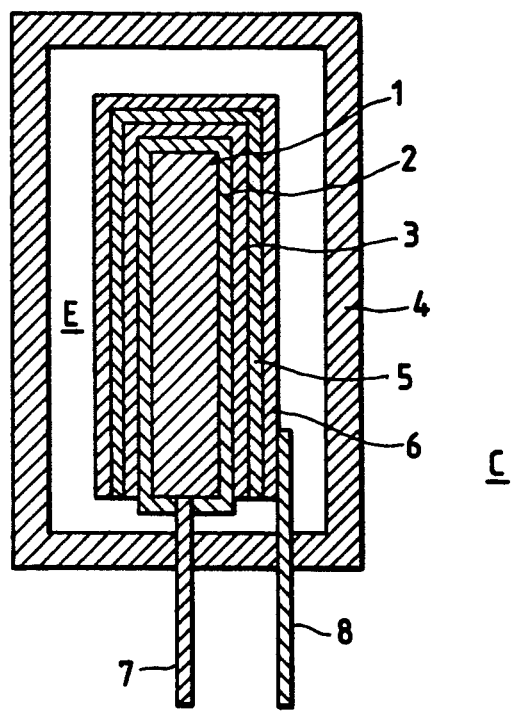
FIG. 1 is a schematic view of a solid electrolytic capacitor according to one embodiment of the invention showing a capacitor element in a spaced relation.

A solid electrolytic capacitor according to one embodiment of the invention includes a capacitor element which has a valve metal substrate having a dielectric film on the surfaces thereof, and a conductive polymer solid electrolyte layer formed on the dielectric film. The invention is characterized in that the capacitor element is encased or held in a resin casing substantially in a spaced relation to the casing.

Reference is now made to the accompanying drawings in which like reference numerals indicate like parts or members.

In the drawings, there is generally shown a solid electrolytic capacitor C including a capacitor element E. The element E has an anode 1 made, for example, of a valve metal. The valve metal anode 1 has a dielectric film 2 formed by a usual anodization technique. A conductive layer 3 is formed on the dielectric film 2. As is known in the art, the capacitor element may further comprise a graphite layer 5 and a conductive layer 6 such as a silver paint for attachment of an cathode lead 8. The anode 1 has an anode lead 7 as shown.

The capacitor element E is encased in a casing 4 in such a way that the element E per se is not contacted with the casing 4 but the element is held with the casing 4 through the leads 7 and 8 as shown.

The valve metal used as the anode 1 is, for example, aluminum, tantalum, titanium or alloys thereof and may take a form of a foil, a sheet, a plate or the like. The dielectric film is as described above.

The solid electrolyte layer 4 is made of an organic conductive polymer. The organic conductive polymer is made, for example, of polymers of heterocyclic monomers such as pyrrole, thiophene, furan and derivatives thereof, which are doped with appropriate anions such as sulfonates, phosphates, carboxylates, perchlorates and the like. The organic conductive polymer layer 4 may be formed by chemical oxidation polymerization or electrolytic polymerization. In the latter case, an inorganic conductive layer such as of manganese oxides may be formed on the dielectric film. The electrolytically polymerized layer 3 is then formed on the inorganic conductive layer. The formation of the inorganic conductive layer such as of manganese oxides from manganese salts is well known in the art and is particularly described in examples.

The casing 4 should be made of any thermoplastic resins including, for example, polyphenylene sulfide, polyphenylene oxide, polyphenylene terephthalate, polyoxymethylene, polycarbonates and the like. Of these, polyphenylene sulfide is preferred because of good barrier properties against moisture and oxygen and a good heat resistance.

Figure 2:
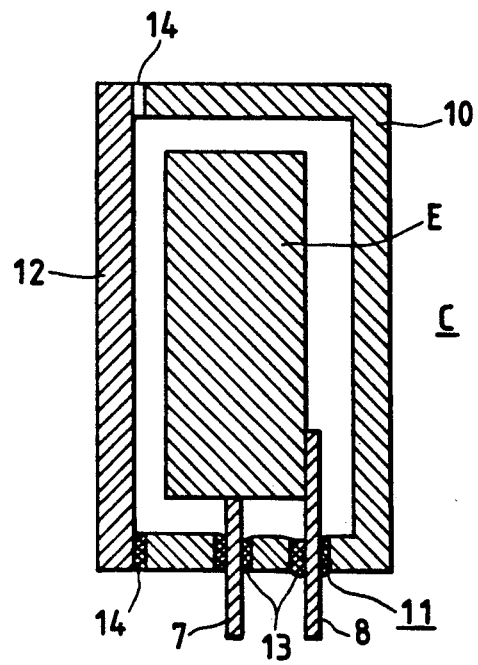
FIG. 2 is a schematic view of a solid electrolytic capacitor showing welding of a casing for sealing.

The encased capacitor element is fabricated by a procedure as illustrated in FIG. 2.

In FIG. 2, the capacitor element E is placed in a case 10 having two through-holes 11, 11 at one side of the case 10 so that the leads 7, 8 are extended through the holes 11, 11 to outside. The case 10 is provided with a cover 12 and the case 10 and the cover 12 are welded at contact portions 12 thereof in order to airtightly seal the case 10 to complete the casing E of FIG. 1. The portions of the leads 7, 8 are sealed with an appropriate curable resin 13 such as an epoxy resin, a polyisocyanate, a polyester or the like.

The welding of the cover 12 is preferably performed according to a ultrasonic welding technique since this welding technique ensures reliable sealing within a short time although other welding techniques which ensure airtight sealing of the casing may be used.

In this arrangement, the capacitor element E is kept in a spaced relation with respect to the casing C but is fixedly held through the leads 7, 8. In this state, when the resin casing C suffers varying conditions of temperature, it may be expanded or shrunk but any stress from the casing is not exerted on the capacitor element E. Accordingly, the solid electrolyte layer is not separated from the dielectric film and the dielectric film is not damaged by the physical deformation of the resin casing as will occur during the fabrication process of the capacitor or by placing the capacitor under temperature varying conditions.

The solid electrolytic capacitor according to another embodiment of the invention is described.

In this embodiment, a capacitor element includes a valve metal anode substrate as used in the first embodiment on which a dielectric film is formed on the surfaces thereof. In this case, an inorganic conductive layer is formed on the the dielectric film, on which a conductive polymer layer is grown by electrolytic polymerization. In this embodiment, it is essential that the dielectric film having the inorganic conductive layer be subjected to anodization in a solution containing at least one type of anion, such as phosphate ions, silicate ions and chromate ions, prior to the electrolytic polymerization.

Examples of compounds capable of yielding such anions include phosphoric acid, ammonium dihydrogenphosphate, diammonium hydrogenphosphate, triammonium phosphate, sodium dihydrogenphosphate, disodium hydrogenphosphate, trisodium phosphate, potassium dihydrogenphosphate, dipotassium hydrogenphosphate, tripotassium phosphate, ammonium sodium hydrogenphosphate and the like for the phosphate ions, silicic acid, sodium silicate, potassium silicate and the like for the silicate ions, and chromic acid, ammonium chromate, sodium chromate, potassium chromate and the like for the chromate ions. The concentration of the anions is generally in the range of from 0.01 to 10% by weight of the solution.

The valve metal substrate used in this embodiment may be aluminium, tantalum or titanium in the form of a foil, a sheet or a plate.

The inorganic conductive layer may be made of manganese oxides, typical of which is manganese dioxide as in the first embodiment.

In this embodiment, electrolytic polymerization is used. Monomers used for these purposes include pyrrole, thiophene and derivatives thereof such as N-methylpyrrole. Besides, furan may also be used. Support electrolytes used in combination with the monomer may be sodium triisopropylnaphthalenesulfonate, n-butyl phosphate, sodium p-toluenesulfonate, sodium anthraquinonesulfonate, sodium naphthalenesulfonate and the like. The support electrolyte is usually used in an amount of from 0.01 to 1 mole/liter of the electrolytic solution for the polymerization.

As a matter of course, the monomers and the support electrolytes may, respectively, be used singly or in combination. The solution may further include suitable additives such as surfactants, soluble polymers, buffers in order to obtain an improved, electrolytically polymerized conductive polymer.

Since the dielectric film is anodized in a solution containing at least one type of anions of phosphate ions, silicate ions and chromate ions, the dielectric film is stabilized and, thus, its reaction with an organic conductive layer under high temperature and high humidity conditions can be suppressed. This leads to the fact that when the resulting capacitor is exposed to high temperature and high humidity conditions, the dielectric film is less degraded by the interaction between the inorganic conductive layer and the dielectric film.

After the anodization, a conductive polymer layer is formed as stated above to obtain a capacitor element. This element may be encased by a usual manner wherein the element is held in contact with a casing. Preferably, the capacitor element is encased in a resin casing in a spaced relation as discussed in the first embodiment. By this, since the capacitor element suffers no stress from the resin casing, it becomes possible to prevent separation of the organic conductive layer from the inorganic conductive layer and damage of the dielectric film, thereby not causing characteristics to be lowered. The solid electrolyte capacitor exhibits a long life under high temperature and high humidity conditions.

The present invention is more particularly described by way of examples. Comparative examples are also shown.

EXAMPLE 1

A 8×10 mm aluminium etched foil was attached with an anode lead and subjected to anodization in a 3% ammonium adipate aqueous solution at about 70° C. at 35 volts to form a dielectric film on the surfaces thereof. Thereafter, the anodized foil was immersed in a 30% manganese nitrate aqueous solution and heated at 250° C. for 10 minutes to deposit thermally decomposed manganese dioxide on the surfaces thereof to provide an anode. An auxiliary electrode made of stainless steel was contacted or brought near to the anode foil, followed by immersing in an electrolytic solution composed of 0.3 moles of pyrrole, 0.15 moles of sodium p-toluenesulfonate and water, thereby forming an electrolytically polymerized film of polypyrrole doped with the naphthalenesulfonate anions through the auxiliary electrode. The film was washed with water and dried, on which a carbon paste and a silver paint were applied, on which a lead for a cathode was attached to obtain a capacitor element.

The capacitor element was accommodated in a case made of polyphenylene sulfide as shown in FIG. 2 and a cover 13 made of polyphenylene sulfide was placed on and welded with the case by ultrasonic welding such that the element was not contacted at any portion except for the leads with the casing. Thereafter, the leads for the cathode and anode were airtightly fixed to the casing with use of an epoxy resin. After aging at 13 volts, the resulting capacitors were subjected to measurement of initial average values of a capacitance and a loss coefficient, both at 120 Hz, and a leakage current two minutes after application of 10 volts. The results are shown in Table 1.

COMPARATIVE EXAMPLE 1

The general procedure of Example 1 was repeated except that the capacitor element was encased in a casing obtained by casting of an epoxy resin composition comprising stoichiometrical amounts of an epoxy resin (Epikote #828, available from Yuka-Shell Epoxy Co., Ltd.) and a diaminodiphenylmethane curing agent by the use of a silicone rubber mold capable of providing the same outer size as in Example 1. The capacitor characteristics were measured with the results shown in Table 1.

EXAMPLE 2

The general procedure of Example 1 was repeated except that a mixture of 0.15 moles of pyrrole and 0.15 moles of N-methylpyrrole was used instead of pyrrole, thereby obtaining a capacitor. The results are shown Table 1.

COMPARATIVE EXAMPLE 2

The general procedure of Example 2 was repeated except that the casing was made in the same manner as in Comparative Example 1, thereby obtaining a capacitor. The results are shown in Table 1.

EXAMPLE 3

The general procedure of Example 1 was repeated except that acetonitrile was used as the solvent, tetraethylammonium perchlorate was used as the support electrolyte, and thiophene was used instead of pyrrole, thereby obtaining a capacitor. The results are shown in Table 1.

COMPARATIVE EXAMPLE 3

The general procedure of Example 3 was repeated except that the casing was made in the same manner as in Comparative Example 1, thereby obtaining a capacitor. The capacitor was subjected measurement of initial characteristics. The results are shown in Table 1.

EXAMPLE 4

The general procedure of Example 1 was repeated except that after embossing, a tantalum foil which had been anodized by the use of a 10% phosphoric acid aqueous solution and by application of 35 volts at about 90° C., thereby obtaining a capacitor. The capacitor was subjected to measurement of initial characteristics. The results are shown in Table 1.

COMPARATIVE EXAMPLE 4

The general procedure of Example 4 was repeated except that the casing was made in the same manner as in Comparative Example 1, thereby obtaining a capacitor. The capacitor was subjected to measurement of initial characteristics. The results are shown in Table 1.

TABLE 1

|  | Capacitance ($\mu$F) | tan $\delta$ (%) | Leakage Current ($\mu$A) |
|---|---|---|---|
| Example 1 | 14.2 | 2.3 | 0.054 |
| Comp. Ex. 1 | 12.3 | 2.5 | 0.95 |
| Example 2 | 13.7 | 3.2 | 0.049 |
| Comp. Ex. 2 | 11.9 | 3.3 | 0.84 |
| Example 3 | 13.6 | 3.2 | 0.063 |
| Comp. Ex. 3 | 12.2 | 3.3 | 1.1 |
| Example 4 | 1.1 | 1.8 | 0.023 |
| Comp. Ex. 4 | 0.92 | 2.0 | 0.34 |

The comparison between Example 1 and Comparative Example 1 reveals that the capacitor of Example 1 is better in the capacitance and the leakage current and is thus very excellent.

This is true of the comparisons between the capacitors of Examples 2 to 4, respectively and Comparative Examples 2 to 4.

In these examples, the electrolytically polymerized layers are formed on the manganese dioxide layer alone. Inorganic layers other than the manganese dioxide layer may be used and include, for example, those of tin oxide, indium oxide and the like. The organic conductive layer may be formed by a procedure other than the electrolytic polymerization, such as a chemical oxidation technique.

The following examples illustrate solid electrolytic capacitors wherein anodization of a dielectric film having an inorganic conductive layer is carried out, after which an organic conductive layer is formed on the inorganic conductive layer.

EXAMPLE 5

A 7 mm long×10 mm wide aluminium etched foil attached with an anode electrode by caulking was subjected to anodization in a 3% ammonium adipate aqueous solution under conditions of a temperature of about 70° C. and a voltage of 70 volts for 40 minutes to form a dielectric film on the surfaces of the etched foil. The foil was subsequently immersed in a 30% manganese nitrate aqueous solution and dried in air, followed by thermal decomposition at 300° C. for 30 minutes to deposit manganese dioxide on the dielectric film. The resultant foil was again subjected to anodization in a 200 ppm phosphoric acid aqueous solution at about 70° C. at a voltage of 70 volts for 20 minutes.

Thereafter, the manganese dioxide-bearing foil was placed in an electrolytic solution containing 0.5 moles of pyrrole, 0.1 mole of sodium triisopropylnaphthalenesulfonate and water, followed by contacting an electrode for polymerization covered with polypyrrole on the surface of the electrode and application of a constant current of 2 mA/foil to the polymerization electrode for 30 minutes, thereby performing electrolytic polymerization to form an electrolytically polymerized conductive polypyrrole layer on the inorganic conductive layer.

After the formation of the solid polymer electrolyte layer, the layer was washed with water and dried. Thereafter, a carbon paint and a silver paint were applied and a cathode lead was attached on the silver paste layer to obtain a solid electrolytic capacitor. Ten capacitors were made in this manner.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 2.

COMPARATIVE EXAMPLE 5

The general procedure of Example 5 was repeated except that the anodization in the phosphoric acid aqueous solution was not performed, thereby obtaining ten capacitors. These capacitors were similarly measured. The results are shown in Table 2.

The comparison between Example 5 and Comparative Example 5 reveals that the stability under high temperature and high humidity conditions is better for the capacitors of Example 5.

EXAMPLE 6

The general procedure of Example 5 was repeated except that an ammonium phosphate aqueous solution was used instead of the phosphoric acid aqueous solution, thereby obtaining ten capacitors.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 2.

COMPARATIVE EXAMPLE 6

The general procedure of Example 6 was repeated except that the anodization in the ammonium phosphate aqueous solution was not performed, thereby obtaining ten capacitors. These capacitors were subjected to similar measurements. The results are shown in Table 2.

The comparison between Example 6 and Comparative Example 6 reveals that the capacitors of the invention are more stable under high temperature and high humidity conditions.

EXAMPLE 7

The general procedure of Example 5 was repeated except that n-butyl phosphate was used instead of sodium triisopropylnaphthalenesulfonate, thereby obtaining ten capacitors.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 2.

COMPARATIVE EXAMPLE 7

The general procedure of Example 7 was repeated except that the anodization in the phosphoric acid aqueous solution was not performed, thereby obtaining ten capacitors. These capacitors were subjected to similar measurements. The results are shown in Table 2.

The comparison between Example 7 and Comparative Example 7 reveals that the capacitors of the invention are more stable under high temperature and high humidity conditions.

EXAMPLE 8

The general procedure of Example 5 was repeated except that there was used, instead of the anodized aluminium etched foil, a 8 mm long × 10 mm wide tantalum foil which had been anodized, after embossing, in a 10% phosphoric acid aqueous solution at about 90° C., thereby obtaining ten capacitors.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 2.

COMPARATIVE EXAMPLE 8

The general procedure of Example 8 was repeated except that the phosphoric acid aqueous solution was not used, thereby obtaining ten capacitors. These capacitors were similarly measured. The results are shown in Table 2.

The comparison between Example 8 and Comparative Example 8 reveals that the capacitors of the invention are more stable under high temperature and high humidity conditions.

EXAMPLE 9

The general procedure of Example 5 was repeated except that there was used, instead of the electrolytic solution consisting of 0.5 moles of pyrrole, 0.1 mole of sodium triisopropylnaphthalenesulfonate, an electrolytic solution consisting of 0.5 moles of thiophene, 0.1 mole of sodium tetrabutylammoniumparatoluate and acetonitrile, thereby obtaining ten capacitors.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 2.

COMPARATIVE EXAMPLE 9

The general procedure of Example 9 was repeated except that the phosphoric acid aqueous solution was not used, thereby obtaining ten capacitors. These capacitors were similarly measured. The results are shown in Table 2.

The comparison between Example 9 and Comparative Example 9 reveals that the capacitors of the invention are more stable under high temperature and high humidity conditions.

TABLE 2

| | Initial Characteristic | | After 1000 Hours at 80° C. and 90% | |
|---|---|---|---|---|
| | Capacitance ($\mu$) | tan $\delta$ (%) | Capacitance ($\mu$) | tan $\delta$ (%) |
| Example 5 | 5.5 | 1.9 | 5.3 | 2.1 |
| Comp. Ex. 5 | 5.2 | 2.1 | 3.4 | 11.5 |
| Example 6 | 5.7 | 2.3 | 5.5 | 2.4 |
| Comp. Ex. 6 | 5.3 | 2.2 | 3.1 | 12.0 |
| Example 7 | 6.0 | 1.3 | 5.8 | 1.5 |
| Comp. Ex. 7 | 5.7 | 1.5 | 3.6 | 13.1 |
| Example 8 | 1.1 | 1.1 | 1.0 | 1.2 |
| Comp. Ex. 8 | 1.0 | 1.2 | 0.6 | 10.3 |
| Example 9 | 5.3 | 2.2 | 5.1 | 2.4 |
| Comp. Ex. 9 | 5.1 | 2.0 | 3.1 | 11.1 |

EXAMPLE 10

The general procedure of Example 5 was repeated except that a sodium silicate aqueous solution was used for anodization instead of the phosphoric acid aqueous solution, thereby obtaining ten capacitors.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 3.

COMPARATIVE EXAMPLE 10

The general procedure of Example 10 was repeated except that the anodization in the silicic acid aqueous solution was not performed, thereby obtaining ten capacitors. These capacitors were subjected to similar measurements. The results are shown in Table 3.

The comparison between Example 10 and Comparative Example 10 reveals that the capacitors of the invention are more stable under high temperature and high humidity conditions.

EXAMPLE 11

The general procedure of Example 5 was repeated except that a sodium chromate aqueous solution was used for anodization instead of the phosphoric acid aqueous solution, thereby obtaining ten capacitors.

Each capacitor was aged at 20 volts for 1 hour and subjected to measurement of initial capacitance and loss coefficient at 120 Hz. Further, the capacitors were exposed to high temperature and high humidity conditions (80° C., 90%) for 1000 hours and again subjected to measurement of the capacitance and loss coefficient at 120 Hz. The average values of the respective measurements are shown in Table 3.

COMPARATIVE EXAMPLE 11

The general procedure of Example 11 was repeated except that the anodization in the silicic acid aqueous solution was not performed, thereby obtaining ten capacitors. These capacitors were subjected to similar measurements. The results are shown in Table 3.

The comparison between Example 11 and Comparative Example 11 reveals that the capacitors of the invention are more stable under high temperature and high humidity conditions.

TABLE 3

|  | Initial Characteristic | | After 1000 Hours at 80° C. and 90% | |
| --- | --- | --- | --- | --- |
|  | Capacitance ($\mu$) | tan $\delta$ (%) | Capacitance ($\mu$) | tan $\delta$ (%) |
| Example 10 | 5.6 | 1.5 | 5.4 | 1.6 |
| Comp. Ex. 10 | 5.5 | 1.6 | 2.6 | 15.2 |
| Example 11 | 5.6 | 1.3 | 5.5 | 1.4 |
| Comp. Ex. 11 | 5.4 | 1.5 | 2.3 | 16.3 |

What is claimed is:

1. A solid electrolytic capacitor which comprises a capacitor element including a valve metal substrate having a dielectric film on the surfaces thereof, a manganese oxide layer formed on the dielectric film, and a conductive polymer solid electrolyte layer formed on the manganese oxide layer; and
a resin casing encasing the capacitor element substantially in a spaced relation with respect to the casing.

2. The solid electrolytic capacitor according to claim 1, wherein said capacitor element has leads extending therefrom and fixed with the resin casing whereby the capacitor element is free of contact with the resin casing.

3. The solid electrolytic capacitor according to claim 1, wherein said conductive polymer solid electrolyte layer is formed from at least one heterocyclic polymerizable monomer, and at least one anion dopant is contained in the polymer.

4. The solid electrolytic capacitor according to claim 3, wherein said at least one heterocyclic polymerizable monomer is selected from pyrrole, thiophene, furan and derivatives thereof.

5. The solid electrolytic capacitor according to claim 1, wherein said valve metal substrate is made of a member selected from the group consisting of aluminium, tantalum and titanium.

6. The solid electrolytic capacitor according to claim 1, wherein said resin casing is made of a thermoplastic resin.

7. The solid electrolytic capacitor according to claim 6, wherein said thermoplastic resin is polyphenylene sulfide.

8. A method for manufacturing a solid electrolytic capacitor which comprises:
providing a valve metal substrate;
forming a dielectric film on the surfaces of said valve metal substrate;
forming a manganese oxide layer on the dielectric film;
forming a conductive polymer solid electrolyte layer on the manganese oxide layer to provide a capacitor element; and
encasing said capacitor element in a resin casing which is substantially in a spaced relation with respect to the capacitor element, the resin casing being in an airtight condition.

9. The method according to claim 8, wherein the airtight condition is established by welding the resin casing.

10. The method according to claim 9, wherein the welding is ultrasonic welding.

11. The method according to claim 8, further comprising attaching leads to the capacitor element and extending the leads through the resin casing to outside of the resin casing, said leads being fixed to the resin casing with a cured resin.

12. A solid electrolytic capacitor which comprises a capacitor element including a valve metal substrate having a dielectric film on the surfaces thereof and an inorganic conductive layer formed on the dielectric film, and a conductive polymer layer formed on the conductive layer after subjecting the inorganic conductive layer-bearing valve metal substrate to anodization in a solution containing anions selected from the group consisting of phosphate ions, silicate ions, chromate ions and mixtures thereof.

13. The solid electrolytic capacitor according to claim 12, wherein said inorganic conductive layer is manganese oxide.

14. The solid electrolytic capacitor according to claim 12, wherein said conductive polymer layer is a polymer obtained by electrolytic polymerization of at least one monomer selected from the group consisting of pyrrole, thiophene, furan and derivatives thereof.

15. The solid electrolytic capacitor according to claim 12, further comprising a resin casing encasing said capacitor element substantially in a spaced relation with respect to said resin casing.

16. The solid electrolytic capacitor according to claim 15, wherein said capacitor element has leads extending through said resin casing and outside of said resin casing.

17. A method for manufacturing a solid electrolytic capacitor which comprises:
   forming a dielectric film on a valve metal substrate;
   forming an inorganic conductive layer on the dielectric film;
   subjecting the inorganic conductive layer-bearing valve metal substrate to anodization in a solution containing anions selected from the group consisting of phosphate ions, silicate ions, chromate ions and mixtures thereof; and
   forming a conductive polymer layer on the inorganic conductive layer.

18. The method according to claim 17, wherein said conductive polymer layer is formed by electrolytic polymerization of a heterocyclic monomer selected from the group consisting of pyrrole, thiophene, furan and derivatives thereof.

19. The method according to claim 18, wherein the electrolytic polymerization is effected by providing an electrode for polymerization in contact with or near to said inorganic conductive layer and applying a potential necessary for the polymerization whereby a polymer is formed from the electrode.

20. The method according to claim 17, further comprising encasing said capacitor element in a resin casing substantially in a spaced relation with respect to said resin casing.

21. The method according to claim 20, wherein said capacitor element is attached with leads through which said capacitor element is fixed to said resin casing.

* * * * *